(12) United States Patent
Talathi et al.

(10) Patent No.: US 10,043,112 B2
(45) Date of Patent: Aug. 7, 2018

(54) PHOTO MANAGEMENT

(71) Applicant: QUALCOMM Incorporated, San Diego, CA (US)

(72) Inventors: Sachin Subhash Talathi, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 14/528,935

(22) Filed: Oct. 30, 2014

(65) Prior Publication Data

US 2015/0254532 A1    Sep. 10, 2015

Related U.S. Application Data

(60) Provisional application No. 61/949,851, filed on Mar. 7, 2014.

(51) Int. Cl.
| | | |
|---|---|---|
| G06F 17/30 | (2006.01) | |
| G06K 9/62 | (2006.01) | |
| G06K 9/66 | (2006.01) | |
| G06N 3/04 | (2006.01) | |
| G06N 99/00 | (2010.01) | |
| G06K 9/46 | (2006.01) | |

(52) U.S. Cl.
CPC ......... *G06K 9/66* (2013.01); *G06F 17/30247* (2013.01); *G06K 9/4628* (2013.01); *G06K 9/6256* (2013.01); *G06K 9/6269* (2013.01); *G06N 3/0454* (2013.01); *G06N 99/005* (2013.01)

(58) Field of Classification Search
CPC .... G06K 9/3233; G06K 9/527; G06K 9/6269; G06N 3/049; G06N 3/048; G06N 3/0445
See application file for complete search history.

(56) References Cited

U.S. PATENT DOCUMENTS

| | | | | |
|---|---|---|---|---|
| 5,239,594 A | * | 8/1993 | Yoda .................... | G06K 9/6272 382/158 |
| 5,337,370 A | * | 8/1994 | Gilles .................. | G06K 9/6292 382/102 |
| 5,444,796 A | * | 8/1995 | Ornstein .............. | G06K 9/6267 382/157 |
| 5,822,742 A | * | 10/1998 | Alkon .................. | G06K 9/4628 382/159 |
| 5,832,182 A | * | 11/1998 | Zhang ................. | G06F 17/3025 382/226 |
| 6,327,581 B1 | * | 12/2001 | Platt ..................... | G06K 9/6256 706/12 |

(Continued)

OTHER PUBLICATIONS

Dahl, et al. "Context-Dependent Pre-Trained Deep Neural Networks for Large-Vocabulary Speech Recognition" IEEE Transactions on Audio, Speech, and Language Processing, vol. 20, No. 1, Jan. 2012, pp. 1-13.*

(Continued)

*Primary Examiner* — Mia M Thomas
(74) *Attorney, Agent, or Firm* — Seyfarth Shaw LLP

(57) ABSTRACT

A method for image processing includes determining features of multiple stored images from a pre-trained deep convolutional network. The method also includes clustering each image of the multiple stored images based on the determined features.

33 Claims, 12 Drawing Sheets

(56) References Cited

U.S. PATENT DOCUMENTS

| | | | | |
|---|---|---|---|---|
| 7,164,798 B2* | 1/2007 | Hua | G06K 9/00711 | 382/229 |
| 7,574,054 B2* | 8/2009 | Gallagher | G06K 9/00697 | 382/115 |
| 8,086,048 B2* | 12/2011 | Naaman | G06F 17/30241 | 382/155 |
| 8,189,880 B2* | 5/2012 | Wen | G06F 17/30259 | 382/118 |
| 8,311,337 B2* | 11/2012 | Chou | G06F 17/30259 | 382/112 |
| 8,386,574 B2* | 2/2013 | Chidlovskii | G06K 9/6284 | 709/206 |
| 8,396,286 B1* | 3/2013 | Aradhye | G06K 9/66 | 382/159 |
| 8,611,678 B2* | 12/2013 | Hanson | G06F 17/3028 | 382/225 |
| 8,811,726 B2* | 8/2014 | Belhumeur | G06K 9/00281 | 382/103 |
| 8,879,813 B1* | 11/2014 | Solanki | G06T 7/0014 | 382/128 |
| 8,913,152 B1* | 12/2014 | Carceroni | G06T 11/60 | 348/222.1 |
| 8,965,112 B1* | 2/2015 | Ibarz | | 382/105 |
| 8,983,193 B1* | 3/2015 | Ordonez Roman | G06K 9/6263 | 382/118 |
| 9,298,978 B1* | 3/2016 | Hlatky | G06K 9/00369 | |
| 9,785,866 B2* | 10/2017 | Hua | G06K 9/66 | |
| 2003/0063780 A1* | 4/2003 | Gutta | G06K 9/00288 | 382/118 |
| 2004/0165767 A1* | 8/2004 | Gokturk | G06K 9/4609 | 382/159 |
| 2005/0276452 A1* | 12/2005 | Boland | G06K 9/00288 | 382/118 |
| 2008/0103996 A1* | 5/2008 | Forman | G06N 99/005 | 706/12 |
| 2008/0159624 A1* | 7/2008 | Sathish | G06K 9/00369 | 382/170 |
| 2008/0232687 A1* | 9/2008 | Petersohn | G06F 17/30802 | 382/173 |
| 2008/0292196 A1* | 11/2008 | Jain | G06F 17/30265 | 382/225 |
| 2008/0298766 A1* | 12/2008 | Wen | G06F 17/30259 | 386/282 |
| 2009/0196464 A1* | 8/2009 | Dimitrova | G06K 9/00295 | 382/118 |
| 2010/0036786 A1* | 2/2010 | Pujara | G06Q 10/107 | 706/46 |
| 2010/0191391 A1* | 7/2010 | Zeng | G01S 13/723 | 701/1 |
| 2010/0226535 A1* | 9/2010 | Kimchi | G06F 3/013 | 382/103 |
| 2010/0312609 A1* | 12/2010 | Epshtein | G06F 17/30867 | 705/14.58 |
| 2011/0119210 A1* | 5/2011 | Zhang | G06N 99/005 | 706/12 |
| 2011/0222724 A1* | 9/2011 | Yang | G06K 9/00248 | 382/103 |
| 2011/0235858 A1* | 9/2011 | Hanson | G06K 9/6218 | 382/103 |
| 2011/0282828 A1* | 11/2011 | Precup | G06K 9/00348 | 706/54 |
| 2011/0302111 A1* | 12/2011 | Chidlovskii | G06N 99/005 | 706/12 |
| 2012/0092509 A1* | 4/2012 | Kim | G06F 3/04817 | 348/207.1 |
| 2012/0263388 A1* | 10/2012 | Vaddadi | G06F 17/30247 | 382/225 |
| 2013/0033608 A1* | 2/2013 | Hong | G06K 9/00664 | 348/187 |
| 2013/0096817 A1* | 4/2013 | Fauci | H04W 4/043 | 701/411 |
| 2013/0156262 A1* | 6/2013 | Taguchi | G06T 7/0046 | 382/103 |
| 2013/0218813 A1* | 8/2013 | Rinott | G06Q 10/10 | 706/12 |
| 2013/0301934 A1* | 11/2013 | Cok | G11B 27/034 | 382/218 |
| 2014/0078320 A1* | 3/2014 | Hong | H04N 5/217 | 348/208.1 |
| 2014/0188462 A1* | 7/2014 | Zadeh | G06N 7/02 | 704/9 |
| 2014/0376819 A1* | 12/2014 | Liu | G06K 9/3233 | 382/205 |
| 2015/0112182 A1* | 4/2015 | Sharma | A61B 5/0261 | 600/408 |
| 2015/0139485 A1* | 5/2015 | Bourdev | G06K 9/00362 | 382/103 |
| 2015/0178383 A1* | 6/2015 | Corrado | G06F 17/30244 | 707/740 |
| 2015/0265251 A1* | 9/2015 | Cho | A61B 8/0825 | 600/437 |
| 2015/0324655 A1* | 11/2015 | Chalasani | G06K 9/6272 | 382/103 |
| 2016/0019415 A1* | 1/2016 | Ra | G06K 9/00268 | 382/197 |
| 2016/0034788 A1* | 2/2016 | Lin | G06K 9/627 | 382/157 |
| 2016/0035078 A1* | 2/2016 | Lin | G06T 7/0002 | 382/157 |
| 2016/0042252 A1* | 2/2016 | Sawhney | G06K 9/6224 | 382/190 |
| 2016/0070673 A1* | 3/2016 | Wang | G06F 17/141 | 708/403 |
| 2016/0140146 A1* | 5/2016 | Wexler | G06F 17/30253 | 707/741 |
| 2016/0140451 A1* | 5/2016 | Li | G06N 99/005 | 706/12 |
| 2016/0179844 A1* | 6/2016 | Shen | G06F 17/30247 | 382/156 |
| 2016/0180151 A1* | 6/2016 | Philbin | G06K 9/00288 | 382/118 |
| 2016/0180195 A1* | 6/2016 | Martinson | G06K 9/6202 | 382/103 |
| 2016/0217349 A1* | 7/2016 | Hua | G06K 9/6218 | |
| 2016/0225053 A1* | 8/2016 | Romley | G06Q 30/0623 | |
| 2016/0239706 A1* | 8/2016 | Dijkman | G06F 17/3028 | |
| 2016/0259995 A1* | 9/2016 | Ishii | G06K 9/46 | |
| 2016/0275414 A1* | 9/2016 | Towal | G06F 17/3028 | |
| 2016/0307071 A1* | 10/2016 | Perronnin | G06K 9/4628 | |

OTHER PUBLICATIONS

Lee et al. "Convolutional Deep Belief Networks for Scalable Unsupervised Learning of Hierarchical Representations" Proceedings of the 26 th International Conference on Machine Learning, Montreal, Canada, 2009. pp. 1-8.*

Hinton, G. "Transforming Auto-Encoders" T. Honkela et al. (Eds.): ICANN 2011, Part I, LNCS 6791, pp. 44-51, 2011. c Springer-Verlag Berlin Heidelberg 2011.*

Krizhevsky, A. et al. "ImageNet Classification with Deep Convolutional Neural Networks" Advances in Neural Information Processing Systems 25, (2012) pp. 1106-1114.*

Moosmann et al. "Randomized Clustering Forests for Image Classification" IEEE Transactions on Pattern Analysis and Machine Intelligence, vol. 30, No. 9, Sep. 2008, pp. 1-15.*

Boutell et al. "Learning multi-label scene classification" Pattern Recognition Journal (37) 2004, pp. 1757-1771.*

Liu D., et al., "Smart batch tagging of photo albums," Proceedings of the 17th ACM international conference on Multimedia, 2009, pp. 809-812.

International Search Report and Written Opinion—PCT/US2015/018107—ISA/EPO—dated May 27, 2015.

Niu X.X., et al., "A novel hybrid CNN SVM classifier for recognizing handwritten digits", Pattern Recognition, Elsevier, GB, vol. 45, No. 4, Sep. 29, 2011 (Sep. 29, 2011) pp. 1318-1325,

(56) References Cited

OTHER PUBLICATIONS

XP028342391, ISSN: 0031-3203, DOI: 10.1016/J.PATCOG.2011.09.021 [retrieved on Oct. 19, 2011] abstract 1. Introduction, 2.1. SVM classifier, 2.2. CNN classifier, 2.3. Hybrid CNN-SVM model; figure 5; table 5.

Soman S.T., et al., "An efficient multiclassifier system based on convolutional neural network for offline handwritten Telugu character recognition", 2013 National Conference on Communications (NCC), IEEE, Feb. 15, 2013 (Feb. 15, 2013), pp. 1-5, XP032350779, DOI: 10.1109/NCC.2013.6488008, ISBN: 978-1-4673-5950-4 the whole document.

\* cited by examiner

PHOTO MANAGEMENT

CROSS-REFERENCE TO RELATED APPLICATION

The present application claims the benefit of U.S. Provisional Patent Application No. 61/949,851, filed on Mar. 7, 2014, and titled "PHOTO MANAGEMENT," the disclosure of which is expressly incorporated by reference herein in its entirety.

BACKGROUND

Field

Certain aspects of the present disclosure generally relate to neural system engineering and, more particularly, to systems and methods for improving the management of captured of images.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome. Thus, it is desirable to provide a neuromorphic receiver to improve the management of captured of images.

SUMMARY

In one aspect of the present disclosure, a method for image processing is disclosed. The method includes determining features of multiple stored images from a pre-trained deep convolutional network. The method also includes clustering each of the stored images based on the determined features.

Another aspect of the present disclosure is directed to an apparatus including means for determining features of multiple stored images from a pre-trained deep convolutional network. The apparatus further includes means for clustering each of the stored images based on the determined features.

In another aspect of the present disclosure, a computer program product for image processing is disclosed. The computer program product has a non-transitory computer-readable medium with non-transitory program code recorded thereon. The program code includes program code to determine features of multiple stored images from a pre-trained deep convolutional network. The program code also includes program code to determine features of the stored images from a pre-trained deep convolutional network.

Another aspect of the present disclosure is directed to an apparatus for image processing having a memory and one or more processors coupled to the memory. The processor(s) is configured to determine features of multiple stored images from a pre-trained deep convolutional network. The processor(s) is also configured to determine features of multiple stored images from a pre-trained deep convolutional network.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
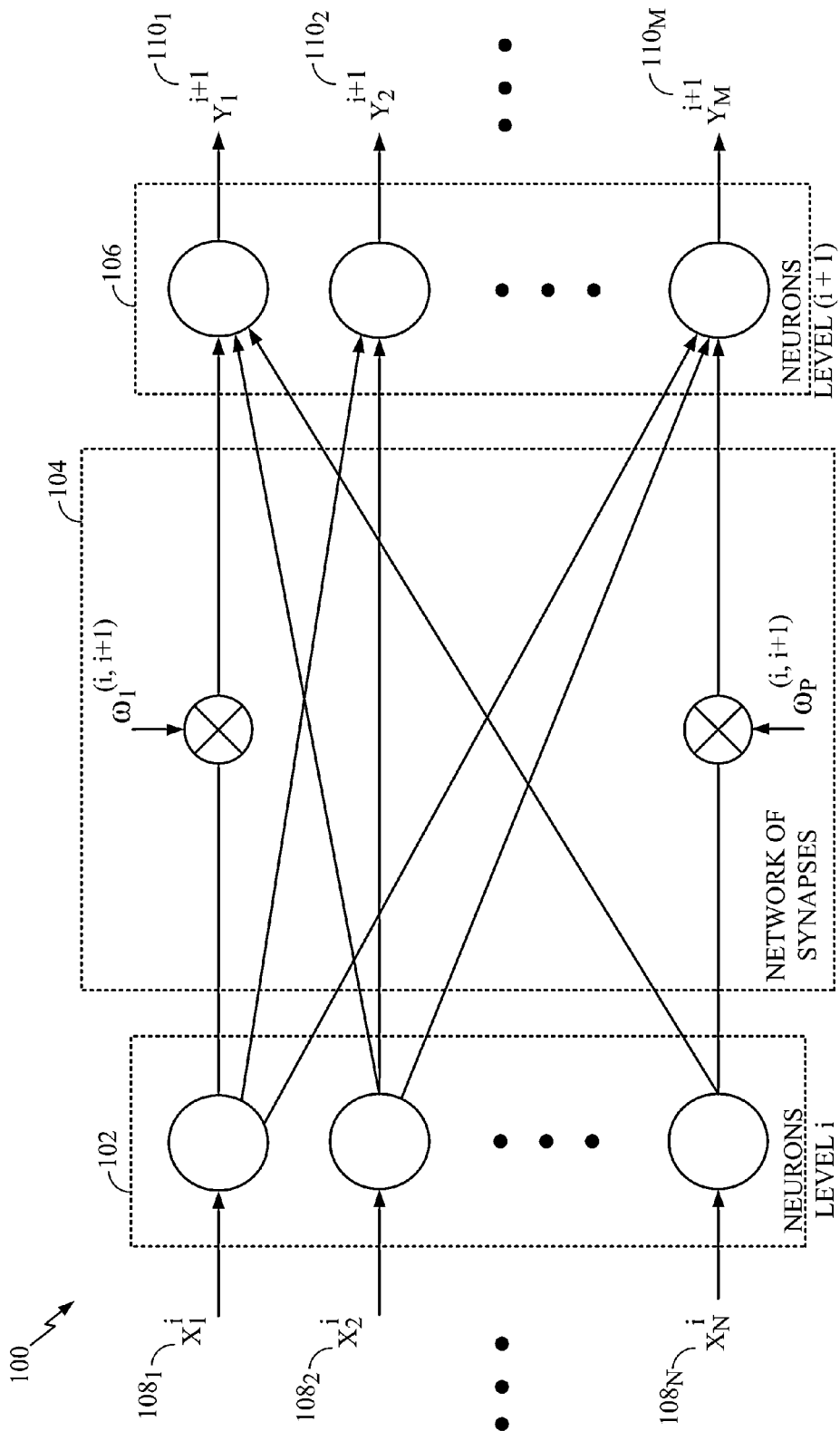
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). In some modeling approaches, the neuron may continuously transfer a signal to the next level of neurons. This signal is typically a function of the membrane potential. Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered presynaptic neurons and neurons of level 106 may be considered postsynaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. In the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
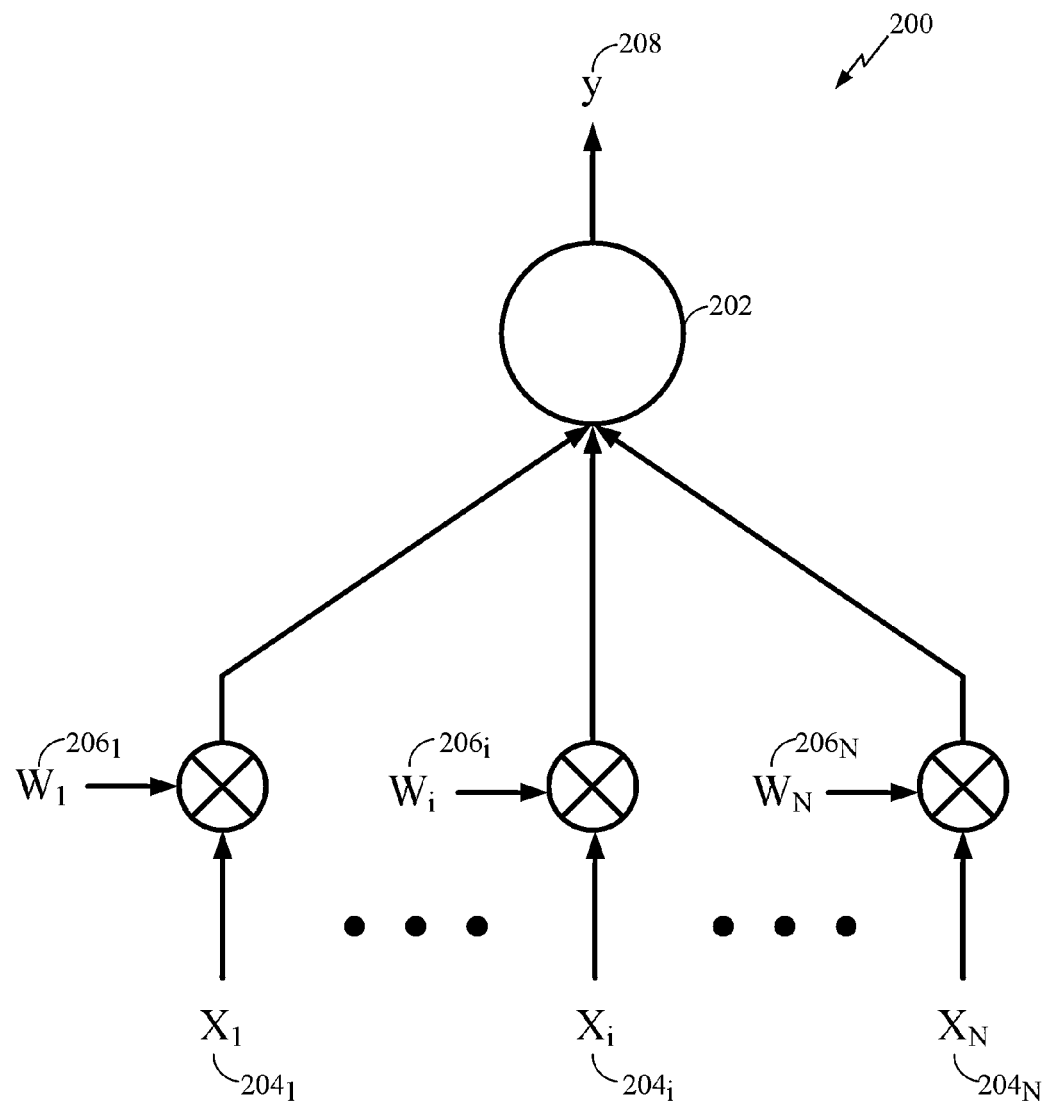
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$, which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}$, . . . , $w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may be non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not use plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) s structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the postsynaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to an insignificant level.

Because a neuron generally produces an output spike when many of its inputs occur within a brief period (i.e., being cumulative sufficient to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a presynaptic neuron to a postsynaptic neuron as a function of time difference between spike time $t_{pre}$ of the presynaptic neuron and spike time $t_{post}$ of the postsynaptic neuron (i.e., $t=t_{post}-t_{pre}$). A typical formulation of the STDP is to increase the synaptic weight (i.e., potentiate the synapse) if the time difference is positive (the presynaptic neuron fires before the postsynaptic neuron), and decrease the synaptic weight (i.e., depress the synapse) if the time difference is negative (the postsynaptic neuron fires before the presynaptic neuron).

In the STDP process, a change of the synaptic weight over time may be typically achieved using an exponential decay, as given by:

$$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_-\tau_{sign(\Delta t)}$ are time constants for positive and negative time difference, respectively, $a_+$ and $a_-$ are corresponding scaling magnitudes, and $\mu$ is an offset that may be applied to the positive time difference and/or the negative time difference.

Figure 3:
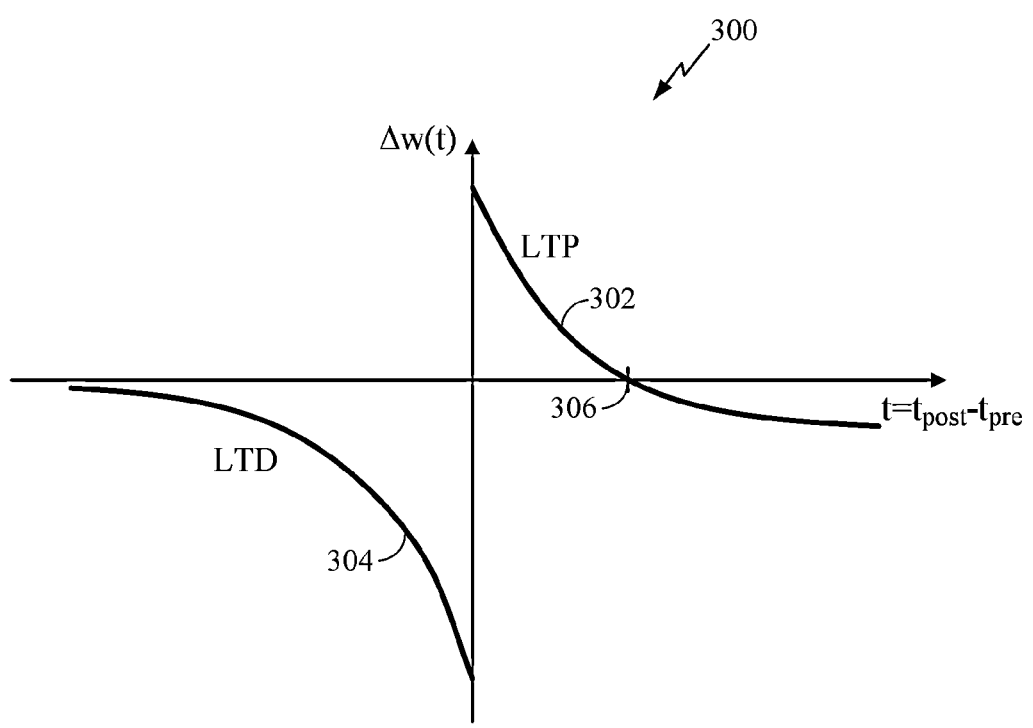
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of presynaptic and postsynaptic spikes in accordance with the STDP. If a presynaptic neuron fires before a postsynaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between presynaptic and postsynaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration comprising spikes or pulses), the offset value $\mu$ can be computed to reflect the frame boundary. A first input spike (pulse) in the frame may be considered to decay over time either as modeled by a postsynaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a presynaptic neuron m to a postsynaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a postsynaptic neuron is established until the time when the postsynaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \qquad (3)$$

$$\frac{du}{dt} = a(b(v - v_r) - u), \qquad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
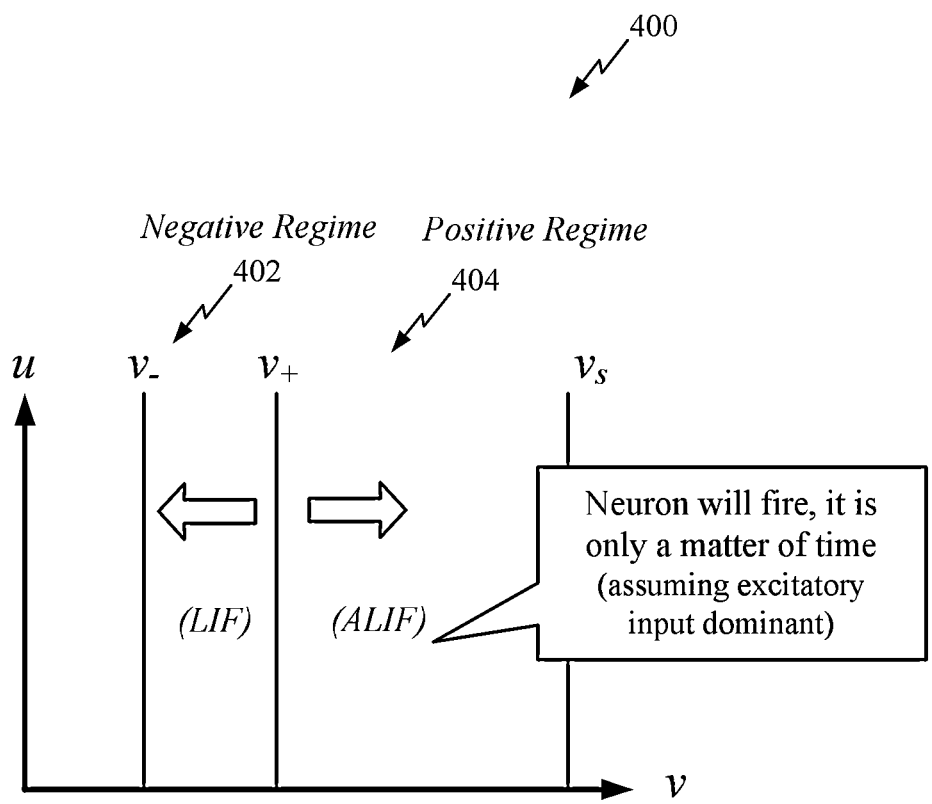
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \qquad (5)$$

$$-\tau_u \frac{du}{dt} = u + r, \qquad (6)$$

where $q_\rho$ and r are the linear transformation variables for coupling.

The symbol ρ is used herein to denote the dynamics regime with the convention to replace the symbol ρ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \qquad (7)$$

$$r = \delta(v + \epsilon), \qquad (8)$$

where δ, ε, β and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter δ is a scale factor controlling the slope of the u null-cline. The parameter ε is typically set equal to $-v_-$. The parameter β is a resistance value controlling the slope of the v null-clines in both regimes. The $\rho_\rho$ time-constant parameters control not only the exponential decays, but also the null-cline slopes in each regime separately.

The model may be defined to spike when the voltage v reaches a value $v_S$. Subsequently, the state may be reset at a reset event (which may be one and the same as the spike event):

$$v = \hat{v}_- \qquad (9)$$

$$u = u + \Delta u, \qquad (10)$$

where $\hat{v}_-$ and $\Delta u$ are parameters. The reset voltage $\hat{v}^-$ is typically set to $v_-$.

By a principle of momentary coupling, a closed form solution is possible not only for state (and with a single exponential term), but also for the time to reach a particular state. The close form state solutions are:

$$v(t + \Delta t) = (v(t) + q_\rho)e^{\frac{\Delta t}{\tau_\rho}} - q_\rho \qquad (11)$$

$$u(t + \Delta t) = (u(t) + r)e^{-\frac{\Delta t}{\tau_u}} - r. \qquad (12)$$

Therefore, the model state may be updated only upon events, such as an input (presynaptic spike) or output (postsynaptic spike). Operations may also be performed at any particular time (whether or not there is input or output).

Moreover, by the momentary coupling principle, the time of a postsynaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho}. \quad (13)$$

If a spike is defined as occurring at the time the voltage state v reaches $v_S$, then the closed-form solution for the amount of time, or relative delay, until a spike occurs as measured from the time that the voltage is at a given state v is:

$$\Delta t_s = \begin{cases} \tau_+ \log \frac{v_s + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily utilize iterative methods or Numerical methods. An event-based implementation is also possible at a limited time resolution in a step-based simulator by only updating the model if an event occurs at or between steps or by "step-event" update.

Image Management

With the advent of camera phones and digital cameras, users may capture an increased number of images. For example, camera phones may capture an increased number of images during a vacation or at an event, such as a concert. Furthermore, camera capabilities, such as burst mode, also increase the number of captured images. Thus, there is a need to provide an improved image management system.

A conventional image management system sorts images based on detected faces and/or available meta-data, such as a when the image was captured, where the image was captured, the file size, the media type (e.g., jpg, bmp, or png), photo ratings, photo tags, and/or a number of image views. An aspect of the present disclosure is directed to a deep convolutional neural network (DCN) learning module to improve image management by sorting images based on characteristics of the image. The sorted images may be placed into specific folders based on labels determined from assigned clusters.

One aspect of the present disclosure is directed to a trained deep neural network feature extractor, such as a deep convolutional network feature extractor, and a trained neural network classifier, such as a multilayer perceptron. In one configuration, a deep convolutional network is specified and pre-trained with images that include various class labels using back propagation. Furthermore, the top layers that form the classifiers are removed to obtain a feature vector for each image. That is, a feature vector is output from a layer of the deep convolutional network. More specifically, the layer is before the top layer of the deep convolutional network.

In one configuration, the feature extractor network is pretrained on one or more image sets. Furthermore, in the present configuration, the feature extractor network extracts the relevant features from the images stored in the device. In one configuration, one set of feature vectors are extracted per image.

Additionally, the feature vectors are clustered using a clustering system, such as using k-means clustering or g-means clustering. For k-means clustering, the number of desired clusters is specified. For g-means clustering, the number of clusters is determined based on the data input. In this configuration, a feature vector is assigned to a cluster. Accordingly, a set of cluster centers may be formed to correspond to the set of images. The images may have a meta tag updated to include the aforementioned cluster value. The clustering performed based on the set of feature vectors may be referred to as unsupervised clustering.

Thus, according to aspects of the present disclosure, the stored images are classified into clusters based on categories identified via the feature extractor network. More specifically, each image is associated with a specific cluster based on the identified features. In one configuration, each image is associated with one cluster. Of course, aspects are also contemplated for an image to be associated with multiple clusters. Furthermore, the feature extractor network may be on the device, cloud based, and/or on an external device.

Furthermore, a label is assigned for each image based on the distance of the feature vectors to the center of the cluster. That is, after forming the set of cluster centers, the images may be labeled based on the closest cluster center. For example, images within a certain distance from a cluster center may be given a specific label. For example, if the distance is infinity, all images corresponding to the cluster will be given the specific label. Alternatively, or in addition to, a specific percentage of images associated with the cluster may be assigned a specific label. That is, a number of images up to a threshold, such as a specific percent, may be assigned a specific label.

Additionally, a classifier, such as a support vector machine (SVM) classifier or a multi-layer perceptron, may be specified to use the assigned labels to determine new classification boundaries. For example, the classifier may label a first cluster as a building cluster, a second cluster as an animal cluster, and a third cluster as a sunset cluster. In another configuration, the feature extractor network generates the clusters and the user labels of the clusters as desired.

The images are re-sorted according to the new classification boundaries. Specifically, the labeled images are classified based on the deep convolutional network feature vectors based on a trained classifier. After classifying the images with the trained classifier, the images may be sorted into folders such that there is one folder for each classification. In one configuration, the images may be assigned to groups, based on the classifier, and the images may be placed into folders based on the groups.

In one configuration, a second trained classifier is trained off-line on the set of feature vectors for a set of class labels.

Specifically, the cluster centers may be input to the second trained classifier so that an initial label is given to each folder.

Furthermore, the user may rename default or initial folders based on the images in the folders. Additionally, some images may not be labelled because the image may be beyond a threshold distance from a cluster center and/or may not be within the specified percentage of images selected to be labelled. Therefore, the user may also place the un-labeled images in specific folders. Additionally, or alternatively, the user may re-label specific folders based on the un-labeled images. Thus, the labelling and classification performed based on the trained classifier may be referred to as supervised clustering.

In one aspect, for supervised training all images in a cluster are not labeled. Rather, only images within a specified distance d, or only the n closest or only the p percent closest are labeled. These images are then used for supervised classifier training. Such images may be referred to as "strong" labels.

That is, in one configuration, the user may view the images in the clusters and determine that a first type of image, such as images of flowers, are in a first cluster, a second type of image, such as images of people, are in a second cluster, and a third type of image, such as images of buildings, are in a third cluster. The clusters of images are customized to the types of stored images and correspond to a user's preferences. Still, the user may label the clusters and/or modify the contents of the clusters.

For example, the cluster that includes images of buildings may also include images of people. The user may determine that the image of the person should belong in the cluster for images of people and may subsequently move the image from the building cluster to the people cluster. In one configuration, based on the re-classification of the image, the deep convolutional network learns the user's preferences. That is, the k-means clustering may be fine-tuned. More specifically, a classifier, such as a multi-layer perceptron classifier or a support vector machine classifier, may be executed to re-label only the moved images.

Moreover, the user may move an image from the pre-assigned cluster to another cluster based on the user's preference. That is, the user may re-classify the image and the re-classification may modify other clusters that include similar image categories. Specifically, the clusters may be modified based on real time training of the neural network classifier.

For example, after the images have been clustered based on the identified category, the user may determine that images with flowers are in a first cluster, images of people are in a second cluster, and images of buildings are in a third cluster. The three clusters may be custom to the types of images captured by the user and/or based on the user's preferences. Furthermore, the user may label the clusters based on the categories or a user preference. Additionally, in this example, the user may notice one or more images in one cluster, such as the people cluster, may be better suited for another cluster, such as the building cluster. Therefore, the user may move the one or more images from one cluster to another cluster.

Thus, in one configuration, based on the present example, the neural network learns the user preferences based on the movement of one or more images from one cluster to another cluster. The learned preferences may be used for subsequent categorization and/or clustering. Furthermore, the learned preferences may also be used to re-sort images that are already placed in various clusters.

In yet another configuration, the user specifies one or more new categories and/or modifies existing categories so that the images are re-sorted according to user specified categories. Moreover, the user may select one or more of the images to be re-classified after modifying the existing categories. In this configuration, the categorized images are re-sorted based on real time training of the neural network classifier.

Based on the previous example, images with flowers are in a first folder, images of people are in a second folder, and images of buildings are in a third folder. In this example, the user may create a fourth folder for images of sunsets and may move one or more images of sunsets from the other folders to the fourth folder. In this configuration, the neural network learns the user preferences based on the newly generated folder and/or the movement of one or more images from one folder to the newly created folder. Furthermore, the learned preferences may be used for subsequent categorization and/or clustering. The learned preferences may also be used to re-sort images that are already placed in various folders.

As another example, the user may re-label one or more of the folders. For example, the user may determine that the flower folder includes images of flowers, parks, rivers, and/or other types of foliage. Therefore, in this example, the user may change the label of the first folder from flowers to another label, such as nature. Furthermore, the user may move one or more images from the other folders to the nature folder. Additionally, or alternatively, the user may also move one or more images from the nature folder to another folder. In this configuration, the neural network learns the user preferences based on the re-labeling of the folder and/or the movement of one or more images from one folder to the re-labeled folder. Furthermore, the learned preferences may be used for subsequent categorization and/or clustering. The learned preferences may also be used to re-sort images that are already placed in various folders.

In still another configuration, the user may share the user specified image categories with other users. Accordingly, images of the other user may be sorted in the same manner as the original user based on the shared user specified image categories. The user may be referred to as the primary user and the other users may be referred to as secondary users.

For example, as previously discussed, the primary user may create a fourth label for sunsets. Additionally, or alternatively, in the previous example, the primary user may re-label the flower category as a nature category. Furthermore, in this configuration, the primary user shares the new category and/or the re-labeled category with one or more secondary users. Moreover, in this configuration, each neural network associated with the secondary users may learn the primary user's preferences for the new folder and/or the re-labeled folder. Additionally, or alternatively, each neural network associated with the secondary users may also learn the primary user's preferences based on movement of images from one folder to another after creating the new folder and/or re-labeling a folder. Furthermore, the learned preferences may be used for subsequent categorization and/or clustering for the images of the second user. The learned preferences may also be used to resort images that are already placed in various folders of the second user.

As previously discussed, aspects of the present disclosure are directed to improving the management of stored images. That is, the stored images are automatically sorted into a set of folders based on the identified categories. As an example, the user may select a group of images and select a button or key to sort the images.

Figure 5A:
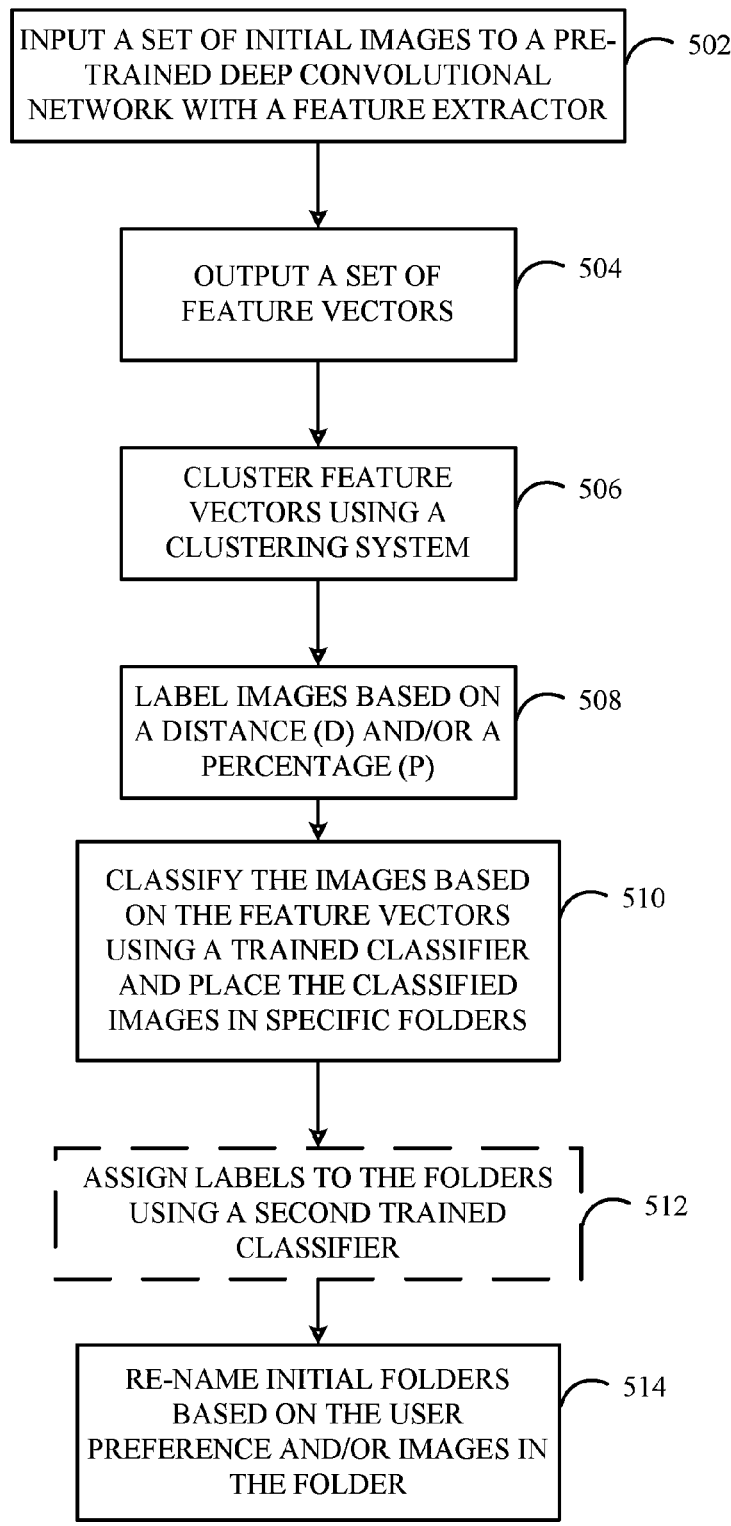
FIGS. 5A-5C illustrate flow diagrams for examples of automated sorting and classifying using a pre-trained feature extractor according to aspects of the present disclosure.

FIG. 5A illustrates a flow diagram for an example for automated sorting and classifying using a pre-trained feature extractor according to an aspect of the present disclosure. As shown in FIG. 5A, at block 502, set of initial images is input to a pre-trained deep convolutional network with a feature extractor. As previously discussed, the deep convolutional network is pre-trained with images that include various class labels using back propagation. Furthermore, the top layers that form the classifiers are removed to obtain a feature vector for each image. Thus, as shown in FIG. 5A, at block 504, a set of feature vectors is output from a layer of the deep convolutional network. Specifically, one feature vector may be output for each image.

Additionally, as shown in FIG. 5A, at block 506, the feature vectors are clustered using a clustering system, such as using k-means clustering or g-means clustering. The clustering system outputs a set of cluster centers and corresponding images. Furthermore, at block 508, the images are labelled based on a distance (d) from the cluster center and/or a percentage (p). That is, images within a specific distance (d) of the cluster center may be given a specific label. Additionally, or alternatively, a percentage (p) of images corresponding to a cluster center may be given a specific label. Furthermore, in one configuration, a classifier, such as a support vector machine (SVM) classifier or a multi-layer perceptron, may be trained on the labeled feature vectors.

Moreover, as shown in FIG. 5A, at block 510, the images are classified based on the feature vectors with a trained classifier. The classified images may be sorted into folders such that there is one folder per classification. In an optional step, at block 512, a second trained classifier may be specified to assign labels to the folders. Furthermore, at block 514, a user may re-name initial folders based on the user preference and/or images in the folder. Additionally, the user may label the images that were not labeled by the labeler at block 508.

Figure 5B:
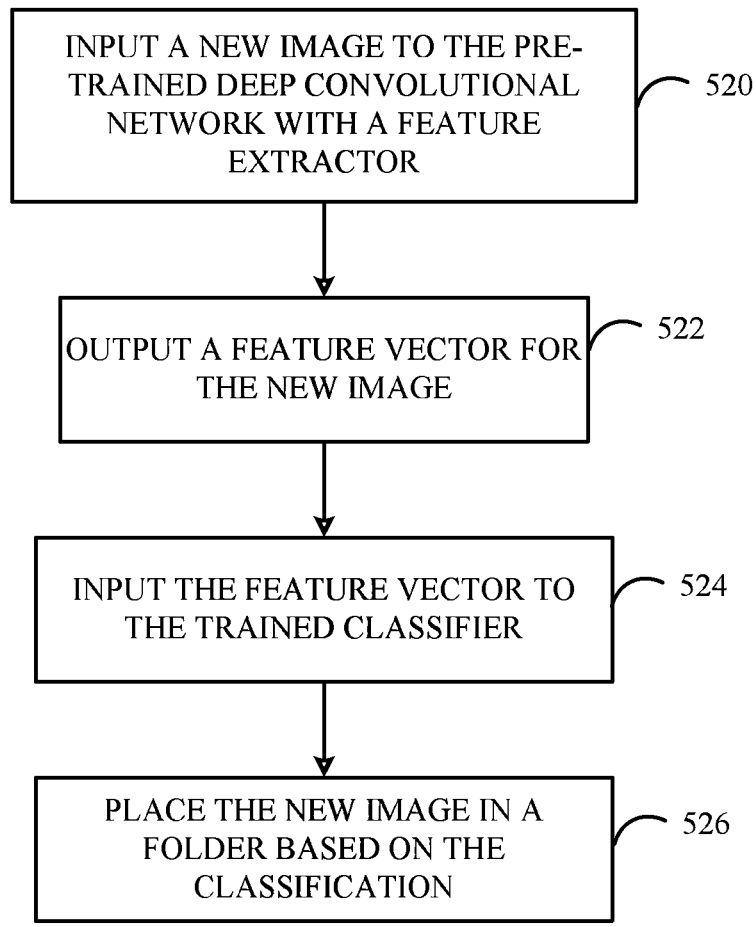

FIG. 5B illustrates a flow diagram for an example for automated sorting and classifying of a new image using a pre-trained feature extractor according to an aspect of the present disclosure. As shown in FIG. 5B, at block 520, a new image is input to the pre-trained deep convolutional network with a feature extractor. The new image is an image that is different from the set of initial images as shown in FIG. 5A. Furthermore, at block 522, a feature extractor outputs a feature vector for the new image. Additionally, at block 524, the feature vector is input to the trained classifier. Finally, at block 526, the trained classifier may place the image in a folder based on the classification. The trained classifier and pre-trained deep convolutional network with a feature extractor of FIG. 5B may be the same as the trained classifier and pre-trained deep convolutional network with a feature extractor specified for FIG. 5A.

Figure 5C:
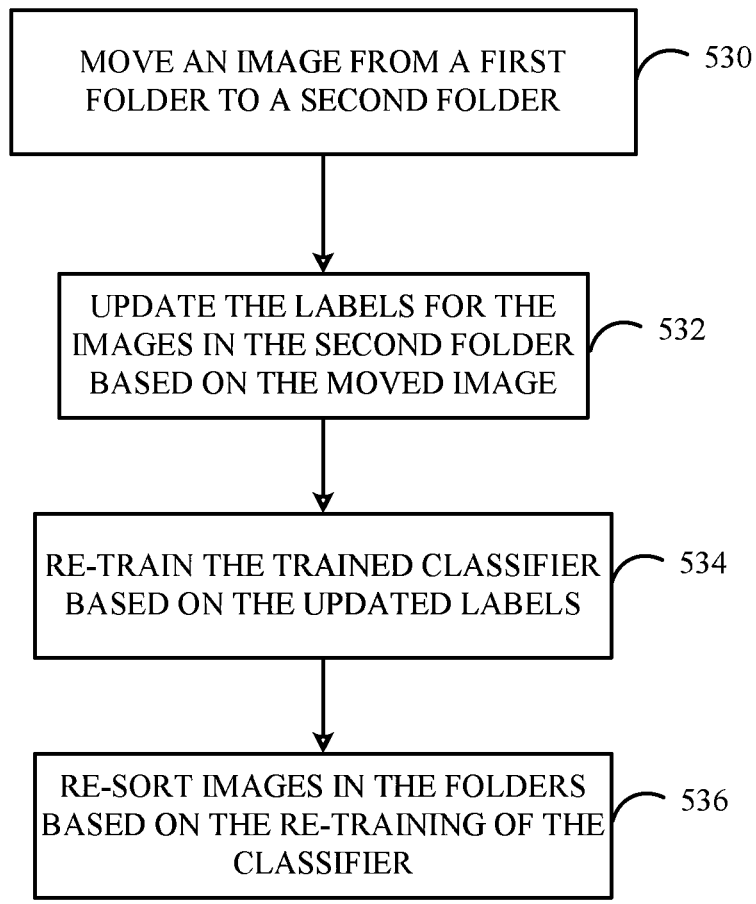

FIG. 5C illustrates a flow diagram for refining training according to an aspect of the present disclosure. As shown in FIG. 5C, at block 530, a user moves an image from a first folder to a second folder. In another configuration, a user may label an un-labeled image and place the image in the folder. In still yet another configuration, the user may re-label the folder. Furthermore, at block 532, the labels for the images in the second folder may be updated based on the moved image and/or the re-labeling. Additionally, at block 534, the trained classifier is retrained based on the updated labels. Finally, at block 536, the images are re-sorted in the folders based on the re-training of the classifier.

Figure 6:
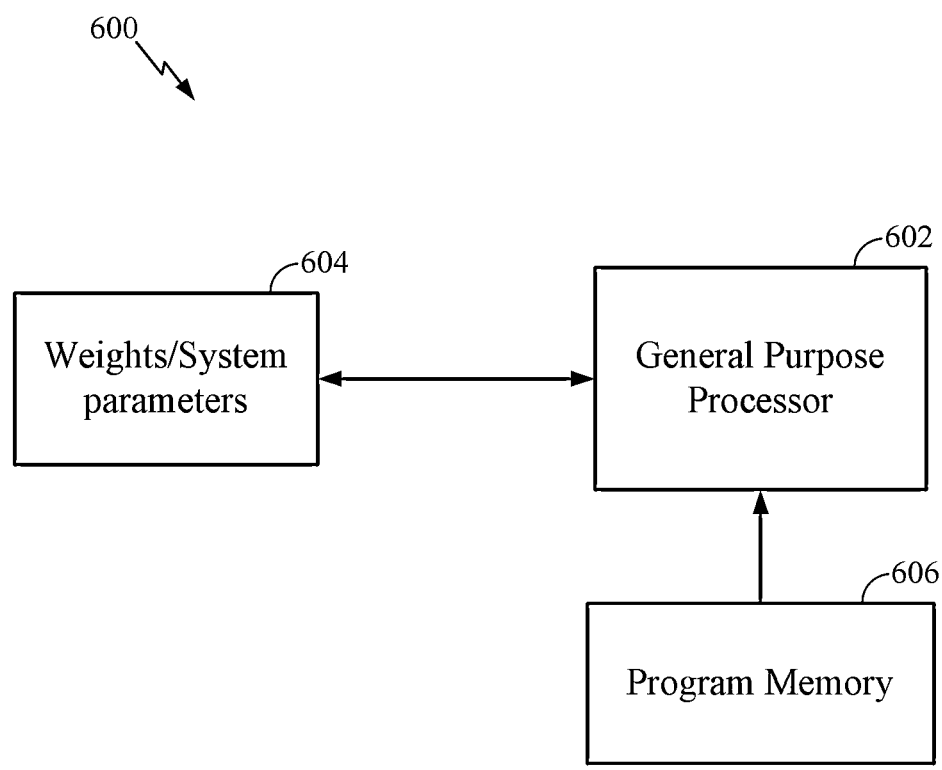
FIG. 6 illustrates an example implementation of designing a neural network using a general-purpose processor in accordance with certain aspects of the present disclosure.

FIG. 6 illustrates an example implementation 600 of the aforementioned image categorization system using a general-purpose processor 602 in accordance with certain aspects of the present disclosure. Variables (neural signals), synaptic weights, system parameters associated with a computational network (neural network), delays, and frequency bin information may be stored in a memory block 604, while instructions executed at the general-purpose processor 602 may be loaded from a program memory 606. In an aspect of the present disclosure, the instructions loaded into the general-purpose processor 602 may comprise code for determining attributes of multiple stored images and/or categorizing each image of the multiple stored images based on the determined attributes.

Figure 7:
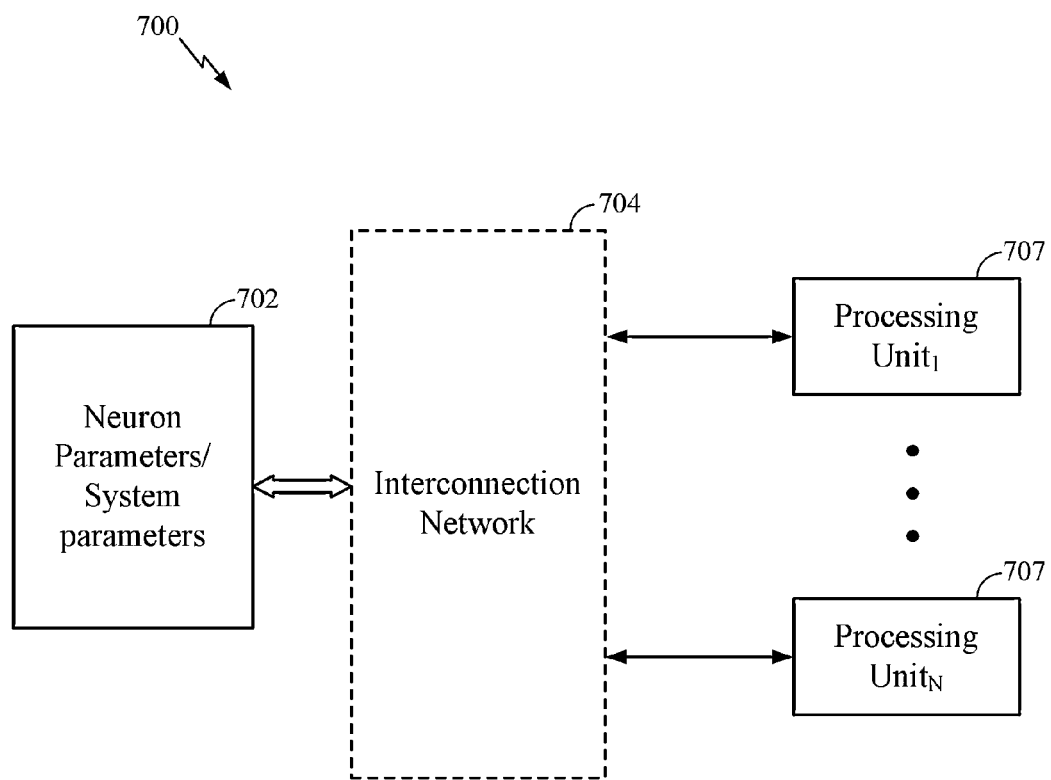
FIG. 7 illustrates an example implementation of designing a neural network where a memory may be interfaced with individual distributed processing units in accordance with certain aspects of the present disclosure.

FIG. 7 illustrates an example implementation 700 of the aforementioned image categorization system where a memory 702 can be interfaced via an interconnection network 704 with individual (distributed) processing units (neural processors) 707 of a computational network (neural network) in accordance with certain aspects of the present disclosure. Variables (neural signals), synaptic weights, system parameters associated with the computational network (neural network) delays, frequency bin information, feature vectors, and/or categories may be stored in the memory 702, and may be loaded from the memory 702 via connection(s) of the interconnection network 704 into each processing unit (neural processor) 707. In an aspect of the present disclosure, the processing unit 707 may be configured to determine attributes of multiple stored images and/or categorize each image of the multiple stored images based on the determined attributes.

Figure 8:
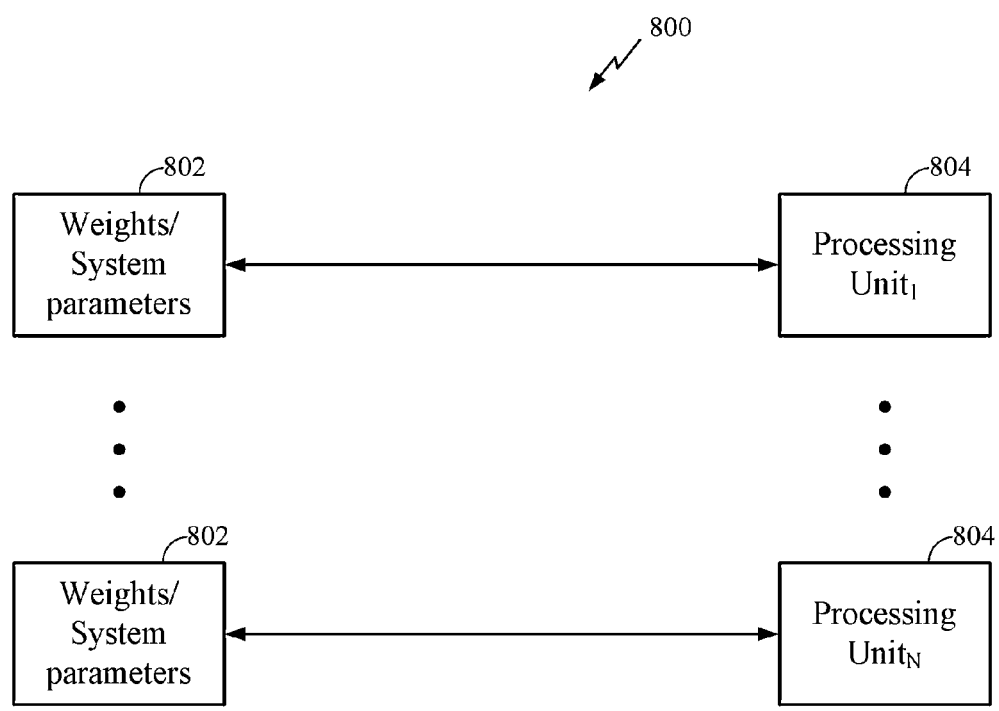
FIG. 8 illustrates an example implementation of designing a neural network based on distributed memories and distributed processing units in accordance with certain aspects of the present disclosure.

FIG. 8 illustrates an example implementation 800 of the aforementioned image categorization system. As illustrated in FIG. 8, one memory bank 802 may be directly interfaced with one processing unit 804 of a computational network (neural network). Each memory bank 802 may store variables (neural signals), synaptic weights, and/or system parameters associated with a corresponding processing unit (neural processor) 804 delays, frequency bin information, feature vectors, and/or categories. In an aspect of the present disclosure, the processing unit 804 may be configured to determine attributes of multiple stored images and/or categorize each image of the multiple stored images based on the determined attributes.

Figure 9:
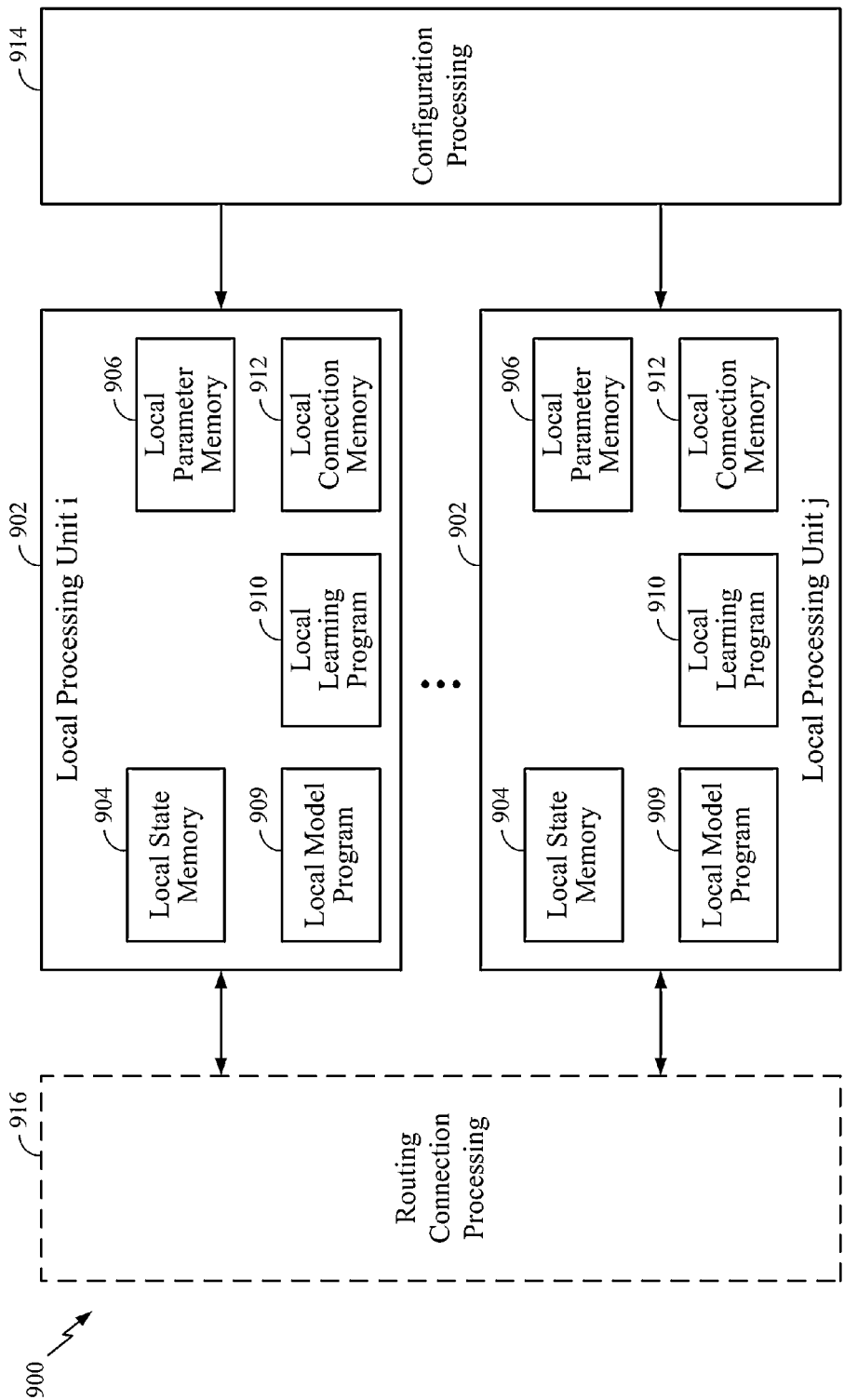
FIG. 9 illustrates an example implementation of a neural network in accordance with certain aspects of the present disclosure.

FIG. 9 illustrates an example implementation of a neural network 900 in accordance with certain aspects of the present disclosure. As illustrated in FIG. 9, the neural network 900 may have multiple local processing units 902 that may perform various operations of methods described above. Each local processing unit 902 may comprise a local state memory 904 and a local parameter memory 906 that store parameters of the neural network. In addition, the local processing unit 902 may have a local (neuron) model program (LMP) memory 909 for storing a local model program, a local learning program (LLP) memory 910 for storing a local learning program, and a local connection memory 912. Furthermore, as illustrated in FIG. 9, each local processing unit 902 may be interfaced with a configuration processor unit 914 for providing configurations for local memories of the local processing unit, and with a routing connection processing unit 916 that provide routing between the local processing units 902.

In one configuration, a neuron model is configured for determining attributes of multiple stored images and/or categorizing each image of the multiple stored images based on the determined attributes. The neuron model includes a determining means, and clustering means. In one aspect, the determining means and clustering means may be the general-purpose processor 602, program memory 606, memory block 604, memory 702, interconnection network 704, processing units 707, processing unit 804, local processing units 902, and or the routing connection processing units 916 configured to perform the functions recited. In another configuration, the aforementioned means may be any module or any apparatus configured to perform the functions recited by the aforementioned means.

According to certain aspects of the present disclosure, each local processing unit 802 may be configured to determine parameters of the neural network based upon desired one or more functional features of the neural network, and develop the one or more functional features towards the desired functional features as the determined parameters are further adapted, tuned and updated.

Figure 10:
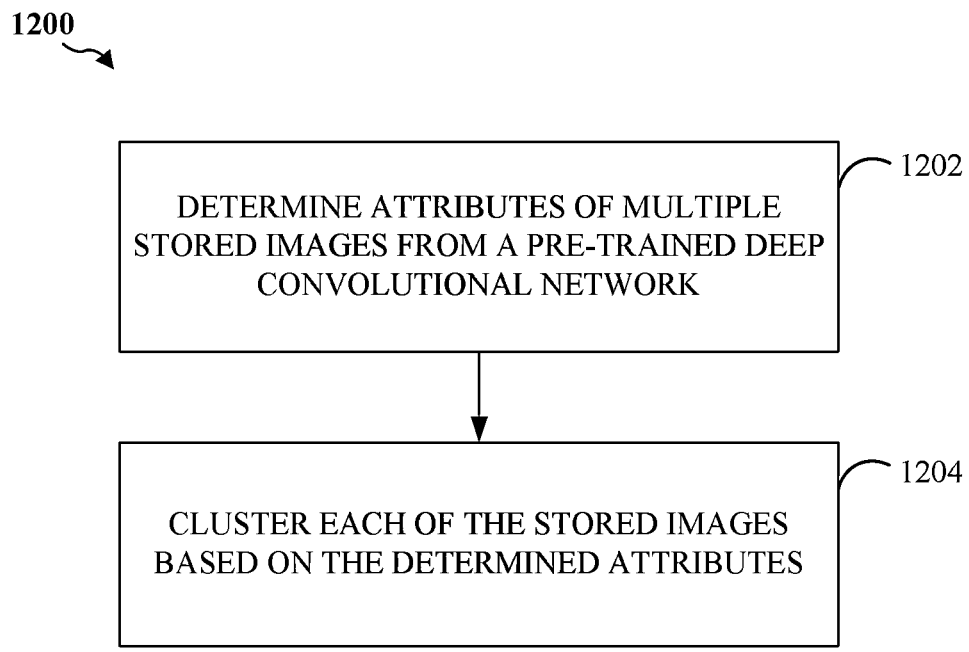
FIG. 10 is a flow diagram illustrating a method for image management in accordance with aspects of the present disclosure.

FIG. 10 illustrates a block diagram 1000 for image processing in accordance with aspects of the present disclosure. In block 1002, a neuron model determines attributes of multiple stored images from a pre-trained deep convolutional network. Furthermore, in block 1004, the neuron model clusters each image of the multiple stored images based on the determined attributes.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:
1. A method for image processing, comprising:
    determining, with a first pre-trained classifier, features of a plurality of stored images, the plurality of stored images being different from a plurality of training images used for training the first pre-trained classifier;
    assigning each image of the plurality of stored images to a cluster of a plurality of clusters based at least in part on the determined features;
    assigning a label to an image of the plurality of stored images based on a distance of the image to a closest cluster center corresponding to the image being less than a first threshold, a pre-defined number of images associated with the closest cluster center being less than a second threshold, and/or a percentage of images associated with the closest cluster center being less than a third threshold;
    modifying the assigned label;
    re-training the first pre-trained classifier with the image when the assigned label is modified; and
    re-sorting the image based at least in part on the re-trained classifier.

2. The method of claim 1, in which the first pre-trained classifier is a support vector machine (SVM), logistic regression, nearest neighbor, or multilayer perceptron (MLP).

3. The method of claim 1, further comprising classifying images of the plurality of stored images into groups based at least in part on corresponding labels.

4. The method of claim 3, further comprising placing each image of the plurality of stored images into a folder based at least in part on a corresponding group.

5. The method of claim 4, further comprising naming the folders with nonspecific names.

6. The method of claim 4, further comprising determining a specific folder name with a second pre-trained classifier.

7. The method of claim 6, further comprising determining, with the second pre-trained classifier, the specific folder name based at least in part on a classification of a cluster center associated with a label for an associated group.

8. The method of claim 7, in which the specific folder name is further determined based at least in part on a majority rule on labeled images of a given folder.

9. The method of claim 4, further comprising receiving user input to modify a specific folder name or assign a new specific folder name.

10. The method of claim 9, further comprising re-training a second pre-trained classifier to include the modified specific folder name or the new specific folder name based at least in part on a cluster center or at least one labeled image feature vector.

11. The method of claim 4, further comprising placing a new image in a folder based at least in part on determining a feature vector of the new image and applying the classifier to determine a group for the new image.

12. The method of claim 3, further comprising receiving user input to modify the assigned label.

13. The method of claim 12, in which the assigned label is modified based at least in part on user input to move the image from a first folder to a second folder.

14. The method of claim 1, further comprising sharing at least one classifier or a list of cluster centers with a second user.

15. The method of claim 14, in which the shared list of cluster centers is combined with a list of cluster centers for the second user to create labels for images of the second user and to update a classifier for the second user.

16. The method of claim 14, further comprising sharing user defined categories for classes or clusters with the second user.

17. An apparatus for image processing, the apparatus comprising:
a memory unit; and
at least one processor coupled to the memory unit, the at least one processor being configured:
to determine, with a first pre-trained classifier, features of a plurality of stored images, the plurality of stored images being different from a plurality of training images used for training the first pre-trained classifier;
to assign each image of the plurality of stored images to a cluster of a plurality of clusters based at least in part on the determined features;
to assign a label to an image of the plurality of stored images based on a distance of the image to a closest cluster center corresponding to the image being less than a first threshold, a pre-defined number of images associated with the closest cluster center being less than a second threshold, and/or a percentage of images associated with the closest cluster center being less than a third threshold;
to modify the assigned label;
to re-train the first pre-trained classifier with the image when the assigned label is modified; and
to re-sort the image based at least in part on the re-trained classifier.

18. The apparatus of claim 17, in which the first pre-trained classifier is a support vector machine (SVM), logistic regression, nearest neighbor, or multilayer perceptron (MLP).

19. The apparatus of claim 17, in which the at least one processor is configured to classify the plurality of stored images into groups based at least in part on corresponding labels.

20. The apparatus of claim 19, in which the at least one processor is configured to place each image of the plurality of stored images into a folder based at least in part on a corresponding group.

21. The apparatus of claim 20, in which the at least one processor is configured to name the folders with nonspecific names.

22. The apparatus of claim 20, in which the at least one processor is configured to determine a specific folder name with a second pre-trained classifier.

23. The apparatus of claim 22, in which the second pre-trained classifier is configured to determine the specific folder name based at least in part on a classification of a cluster center associated with a label for an associated group.

24. The apparatus of claim 23, in which the at least one processor is configured to determine the specific folder name based at least in part on a majority rule on labeled images of a given folder.

25. The apparatus of claim 20, in which the at least one processor is further configured to receive user input to modify a specific folder name or assign a new specific folder name.

26. The apparatus of claim 25, in which the at least one processor is configured to re-train a second pre-trained classifier to include the modified specific folder name or the new specific folder name based at least in part on a cluster center or at least one labeled image feature vector.

27. The apparatus of claim 20, in which the at least one processor is further configured to place a new image in a folder based at least in part on determining a feature vector of the new image and applying the classifier to determine a group for the new image.

28. The apparatus of claim 19, in which the at least one processor is further configured to receive user input to modify the assigned label.

29. The apparatus of claim 28, in which the assigned label is modified based at least in part on user input to move the image from a first folder to a second folder.

30. The apparatus of claim 17, in which the at least one processor is further configured to share at least one classifier or a list of cluster centers with a second user.

31. The apparatus of claim 30, in which the at least one processor is further configured to share user defined categories for classes or clusters with the second user.

32. A non-transitory computer-readable medium having program code recorded thereon for image processing, the program code being executed by a processor and comprising:
program code to determine, with a first pre-trained classifier, features of a plurality of stored images, the plurality of stored images being different from a plurality of training images used for training the first pre-trained classifier;

program code to assign each image of the plurality of stored images to a cluster of a plurality of clusters based at least in part on the determined features;

program code to assign a label to an image of the plurality of stored images based on a distance of the image to a closest cluster center corresponding to the image being less than a first threshold, a pre-defined number of images associated with the closest cluster center being less than a second threshold, and/or a percentage of images associated with the closest cluster center being less than a third threshold;

program code to modify the assigned label;

program code to re-train the first pre-trained classifier with the image when the assigned label is modified; and program code to re-sort the image based at least in part on the re-trained classifier.

33. An apparatus for image processing, the apparatus comprising:

means for determining, with a first pre-trained classifier, features of a plurality of stored images, the plurality of stored images being different from a plurality of training images used for training the first pre-trained classifier;

means for assigning each image of the plurality of stored images to a cluster of a plurality of clusters based at least in part on the determined features;

means for assigning a label to an image of the plurality of stored images based on a distance of the image to a closest cluster center corresponding to the image being less than a first threshold, a pre-defined number of images associated with the closest cluster center being less than a second threshold, and/or a percentage of images associated with the closest cluster center being less than a third threshold;

means for modifying the assigned label;

means for re-training the first pre-trained classifier with the image when the assigned label is modified; and means for re-sorting the image based at least in part on the re-trained classifier.

* * * * *